Figure 6:
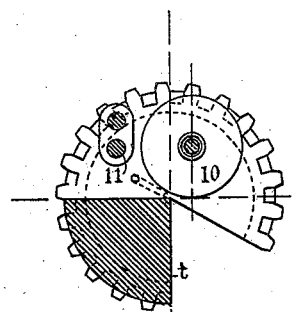

No. 853,028. PATENTED MAY 7, 1907.
H. R. OBERHOLTZER.
FENCE MACHINE.
APPLICATION FILED AUG. 31, 1903.
4 SHEETS—SHEET 1.
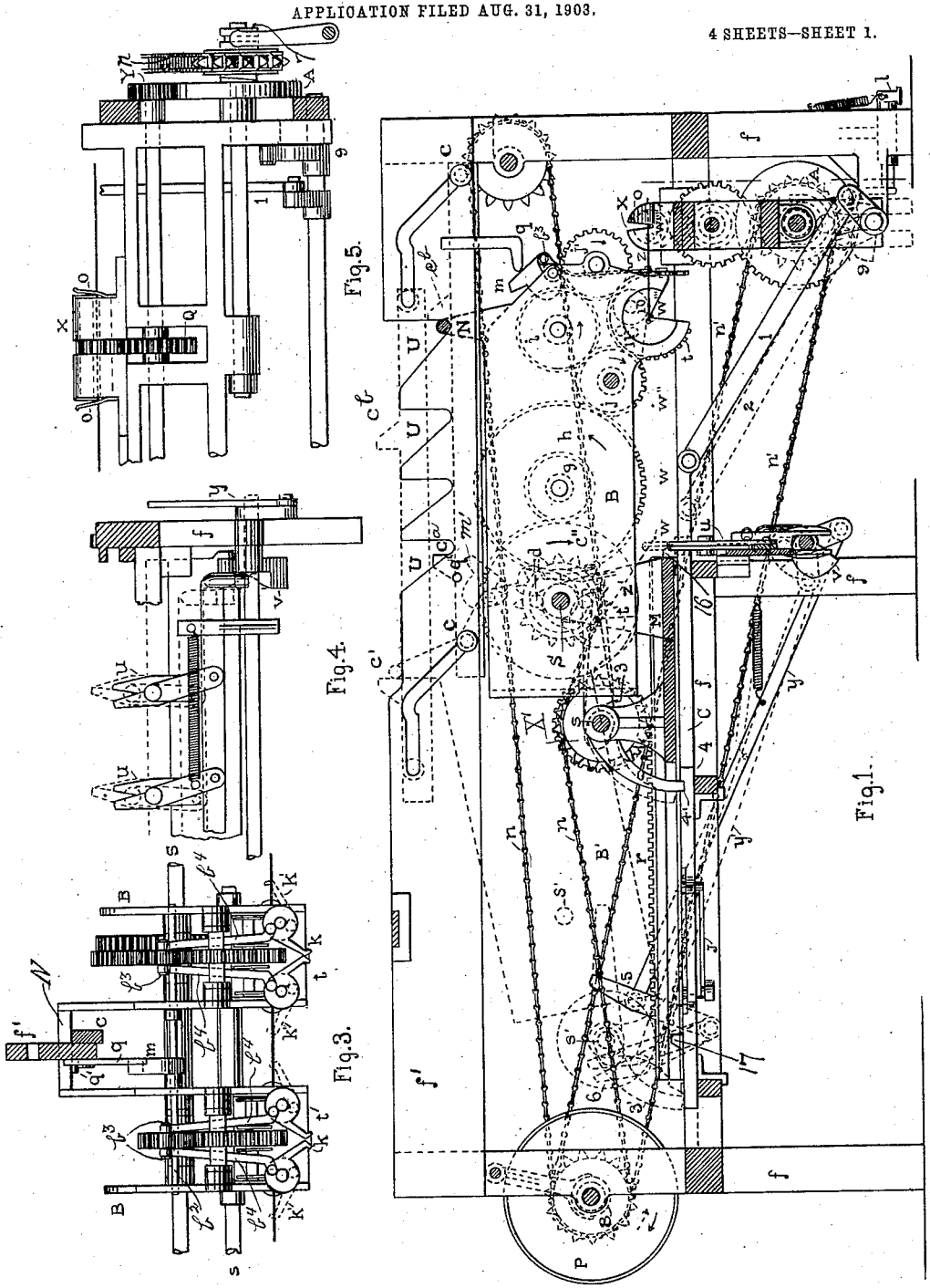
WITNESSES:
Carroll W. Kimball.
Blanche Case.
Henry R. Oberholtzer,
INVENTOR,
BY Clem. F. Kimball,
ATTORNEY.

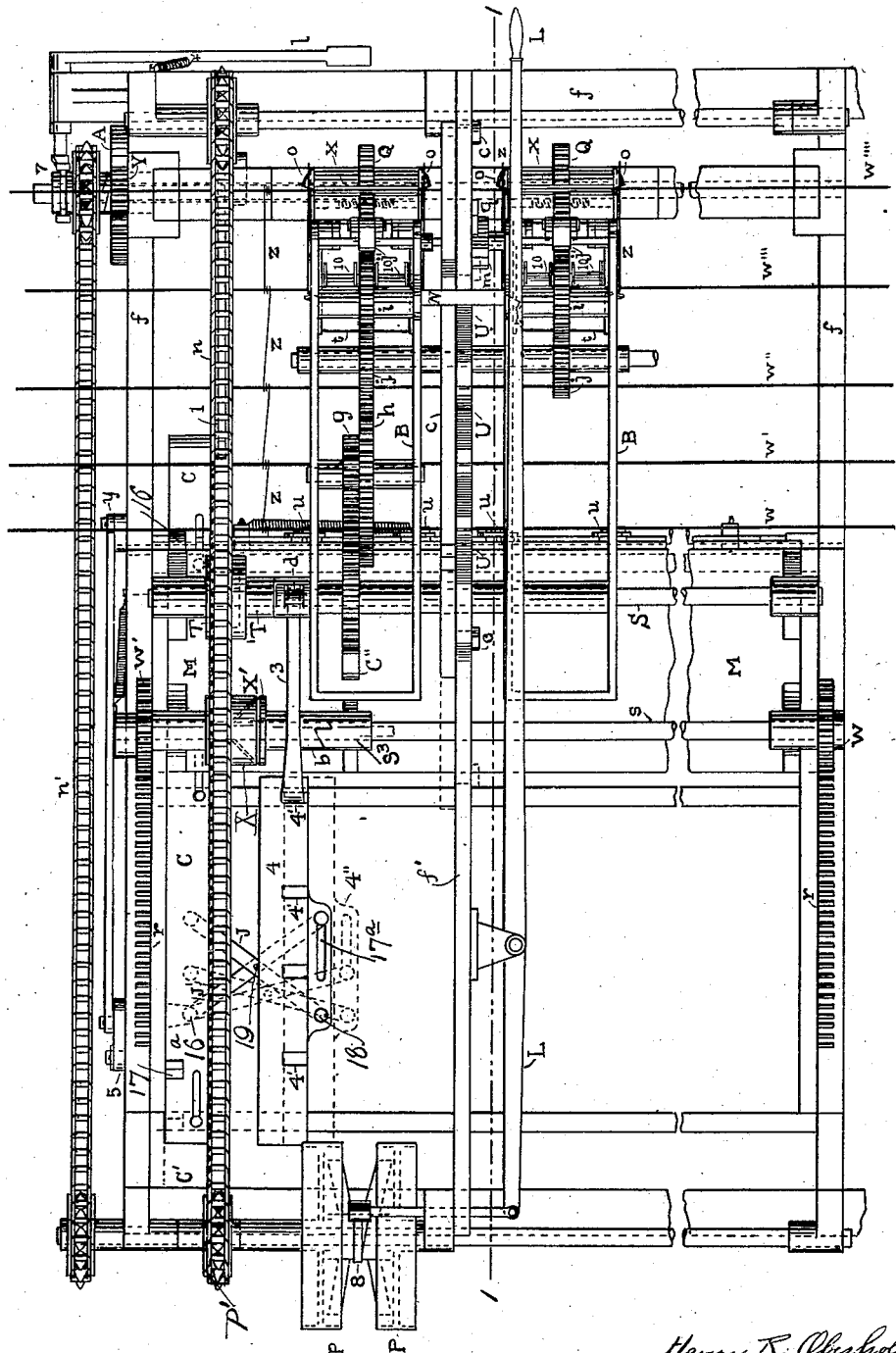

No. 853,028. PATENTED MAY 7, 1907.
H. R. OBERHOLTZER.
FENCE MACHINE.
APPLICATION FILED AUG. 31, 1903.

4 SHEETS—SHEET 3.

WITNESSES:
Carroll W. Kimball.
Blanche Case

Henry R. Oberholtzer
INVENTOR.
BY Clem. F. Kimball
ATTORNEY.

No. 853,028.
PATENTED MAY 7, 1907.
H. R. OBERHOLTZER.
FENCE MACHINE.
APPLICATION FILED AUG. 31, 1903.
4 SHEETS—SHEET 4.
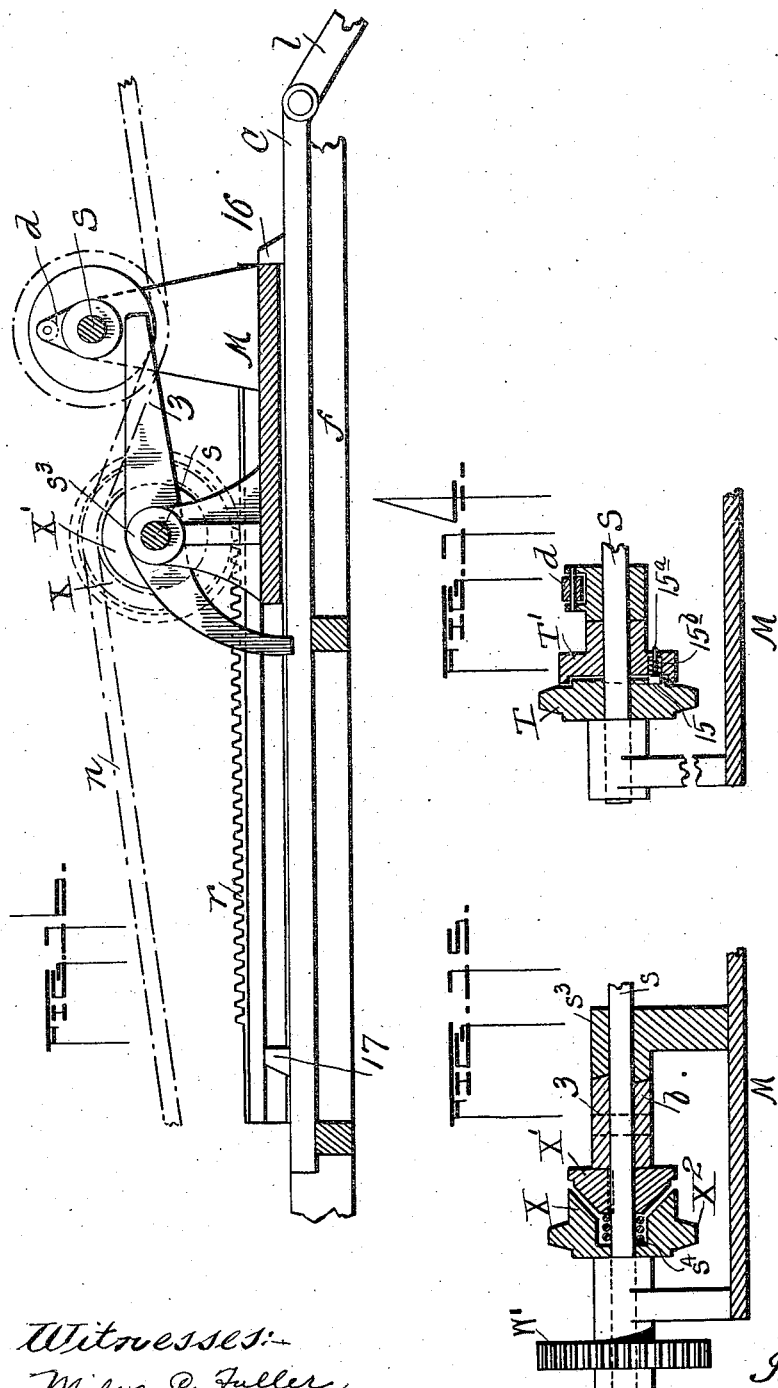
Witnesses:
Inventor.
Henry R. Oberholtzer,
By Chas. N. LaPonte
Atty.

UNITED STATES PATENT OFFICE.

HENRY R. OBERHOLTZER, OF NEBRASKA CITY, NEBRASKA, ASSIGNOR, BY MESNE ASSIGNMENTS, TO INTERLOCKING FENCE COMPANY, OF MORTON, ILLINOIS, A CORPORATION OF ILLINOIS.

FENCE-MACHINE.

No. 853,028.    Specification of Letters Patent.    Patented May 7, 1907.

Application filed August 31, 1903. Serial No. 171,457.

*To all whom it may concern:*

Be it known that I, HENRY R. OBERHOLTZER, a citizen of the United States, residing at Nebraska City, Otoe county, State of Nebraska, have invented a new and useful Fence-Machine, of which the following is a specification.

My invention relates to certain new and useful improvements in fence machines of that type in which a series of twister-heads supplied with spools of wire are employed to twist a cross-wire or picket tightly and firmly upon any number of longitudinal wires at convenient intervals, a series of pickets being thus applied at one operation of the machine, and the primary object thereof is to provide a means for automatically applying and twisting the cross wires or pickets, which are formed of continuous pieces, in several sets, thereby greatly facilitating the manufacture of the fencing material.

A further object is to provide automatic means for severing the cross-wires after they have been twisted upon the longitudinal wires. In this connection bobbins co-act with the twisters so as to enable many picket lengths of wire to be wound thereon, thus obviating the requirement of a new supply after each severing operation.

Further, the invention contemplates the employment of certain auxiliary twisters which twist and hold the free ends of the cross-wires or pickets upon one outer longitudinal wire so as to give sufficient tension for winding the pickets upon the remaining longitudinal wires.

The invention consists further in the provision of a shiftable frame or carriage supporting a series of spools of wire; the said spools having their axes arranged in line, which is in the same general direction of feed of the strand or string of wires being adapted to simultaneously place or weave a series of parallel stays.

Further objects and advantages will be readily apparent in view of the following description and those features upon which I base my claims for patent protection, defined in the appended claims:

In the accompanying drawing, in which like parts are indicated by like reference characters throughout the several views:—

Figure 7:
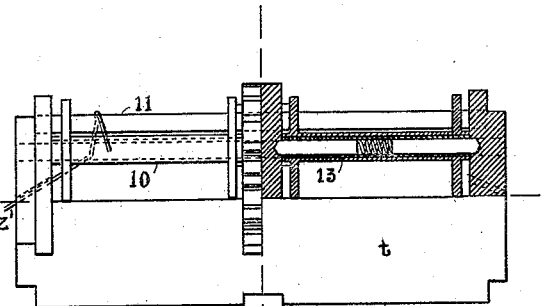
Figure 9:
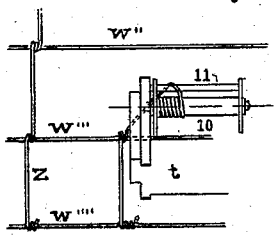
Figure 8:
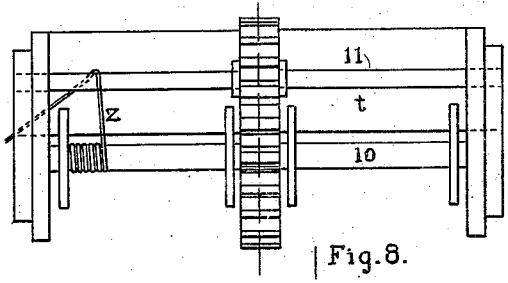
Figure 10:
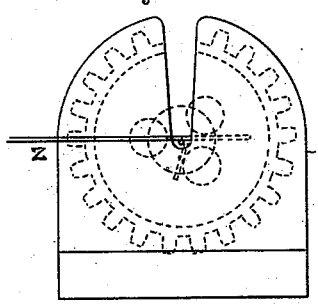
Figure 11:
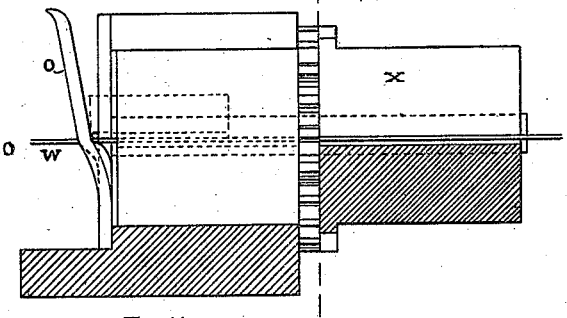
Figure 13:
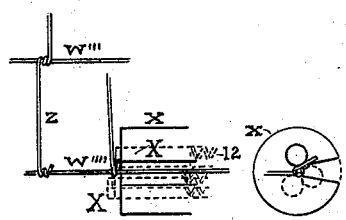
Figure 12:
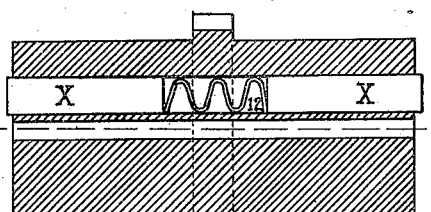

Figure 1 is a sectional view taken on line 1—1 of Fig. 2. Fig. 2 is a plan view of my machine. Fig. 3 is an end elevation of the holders of the twisting part. Fig. 4 is a fragmentary view showing the shears in elevation. Fig. 5 is a side elevation of the wire holder and twister of the free end of the picket. Fig. 6 is a cross section of one of the series of twister-heads. Fig. 7 is a view partly in side elevation and partly in longitudinal section thereof, together with the spools. Fig. 8 is a plan of said twister, and the spools acting in conjunction therewith. Fig. 9 is a diagrammatical view illustrating the manner of feeding wire forming the picket, from a twister-head on to the longitudinal wires. Figs. 10 and 11 are end and side elevations, respectively, of an auxiliary twister employed to hold and twist the free end of a picket; and, Fig. 12 is a cross section of the same. Fig. 13 is a diagram showing a method of twisting the free end of a picket. Fig. 14 is a sectional detail of certain clutch parts for controlling the transmission of power to the twister heads; Fig. 15 is a sectional detail of certain clutch parts for controlling the movement of the plat-form; Fig. 16 is a detail elevation of the platform and parts with which the same coöperates.

*f* indicates a supporting frame having slidably arranged thereon, in any convenient manner, a sliding platform or carriage M. This platform or carriage is provided with rigid standards in which two shafts S and *s* are journaled.

B indicates a pair of parallel frames or boxes supported on the shaft S, which forms a pivot upon which the said frames may oscillate. The said frames are connected at their forward ends by a yoke or cross piece N, adapted to have an intermittent engagement with notches U formed in a centrally and longitudinally disposed frame or beam *f'*, as will be more fully set forth hereafter.

Each frame B has journaled therein a rotary twister head *t*, each of which carries a pair of wire spools 10, the axes of each of said spools of each twister being arranged in line, which is the same general direction in which these strand or string of wires are fed through the machine; this is also true of the axes of each of the twister heads *t*. This arrangement of frames B and the twister heads and spools provides for the placing of a plurality of parallel stay wires at one operation, and while in the drawing there is shown only four spools on two twisters, it is understood that they may be multiplied as desired. I wish it also understood that, while the spools 10 are here shown of equal length, I may vary the length of the spools in each twister. In other words, instead of having the spools 10 of each twister equal in length I may want to make the outside spools longer than the inside spools to adapt their carrying more wire, and thus obviate the necessity of having to replenish the spools as often as would be necessary with spools all of one length. The respective twister heads $t$ have power transmitted to them by a train of gears $j'$, $i$, $j$, $h$, $g$, and $c''$, which are driven upon power being applied to the pulley at P provided with a clutch 8, through the intermediacy of suitable intervening connections, hereinafter more fully explained.

The gear $c''$ fastened to the shaft S, is so arranged to turn the twister heads $t$, a given number of times while the shaft S is making a partial revolution.

On the shaft $s$ is mounted a clutch, comprising the parts $b$, $s^3$, X, and X'. The part X is loose on the shaft and contains sprocket teeth forming a sprocket wheel $X^2$ adapted to be engaged by the chain $n$. The part X' is feathered on the shaft $s$ to slide on as well as rotate with said shaft, and parts X and X' have matching cone faces adapted for frictional contact with each other, in a manner to be described, and are normally held separated by means of a spring $s^4$, see Fig. 15. The part $s^3$ is a part of or attached to a standard secured on the frame M, (see Fig. 15) and its inner end has a clutch face adapted to have engagement with a clutch face of one end of the part $b$, said part $b$ being interposed between $s^3$ and X' on the shaft $s$, and being rotatable thereon. To the part $b$ of this clutch and extending upon opposite sides therefrom is a lever 3, the rear and depending end of which is adapted to successively engage the notches 4' in the plate 4, see Figs. 1, 2 and 16, the latter figure omitting the plate 4. The notches in the plate 4 correspond to the number of longitudinal wires to be picketed or woven together by the cross-pickets and hence are varied in number according to any variation in number of the longitudinal wires.

Upon the shaft S is a projection $d$, preferably a roller, see Fig. 14, designed to engage with the forward end of the lever 3 at each revolution of the said shaft. This shaft is driven by means of the chain $n$, which operates the sprocket wheel T and is driven from the shaft carrying the pulleys P, P, which are arranged to run in opposite directions, loose upon their shaft, except when power is applied by suitable means, as 8, in this case shown as a clutch.

The plate 4 is arranged to slide in a lateral direction when the lever 3 is forced out of the notches 4', of the plate 4, by the projection or roller $d$, on the shaft S, as will be described, which will allow the depending end of the lever 3 to slide upon the plate 4, and be prevented from entering the notches 4'.

$r$ indicates racks disposed on opposite sides of the frame and with which mesh gears W, W' fixed on the opposite ends of the shaft $s$.

The sprocket wheel T and the manner of connecting the same to the shaft S, is best seen in Fig. 14, the face of one side of the hub of which is provided with a graduated slot or groove 15. Although not detailed, this slot or groove is of suitable length and extends from the surface of the face of the hub to approximately the depth seen in Fig. 14; and coacting with the slot or groove 15, is a pin $15^a$ yieldingly held up against the face of the hub of the wheel T. The pin is carried in an auxiliary hub T' which is fast to shaft S, while the wheel is loose thereon, and a spring $15^b$, serves to hold the pin in the manner stated. The wheel T being operated in one direction by the chain $n$, will cause the end wall of the deepest portion of the slot or groove 15 to engage the pin $15^a$ and impart movement to the shaft S; while, if the gear T is rotated in the opposite direction, the slot 15 in the wheel will ride over the pin, as will be understood.

When power is imparted to the shaft S, in the manner just stated, with each revolution thereof, the projection or roller $d$, will engage with forward end of lever 3, and oscillating the lever and partially rotating the interposed clutch part $b$, to which the lever is attached, will cause the clutch face of the part $b$ to ride on the clutch face of the part $s^3$, and the part $b$ to move longitudinally on the shaft and also move the part X' also on said shaft, resulting in a frictional engagement of the cone faces of the parts X and X', simultaneous with the rear depending end of the lever 3, moving out of a notch 4', in the frame 4. Such connection of the clutch parts transmits power from chain $n$ to shaft $s$, which will rotate gears W, W', on the opposite ends of the shaft, and such gears being in mesh with racks $r$, will cause the platform M to be moved on the frame $f$. When the rear end of the lever 3 coincides with the next notch 4', in the plate 4, the projection or roller $d$ having moved off of the opposite end of the lever, the lever will engage with such notch, and the spring $s^4$ acts to separate the clutch parts referred to, bringing the platform to a stand-still.

C denotes a reach or other suitable part extending a suitable length in the machine, the forward end of which is pivotally connected to a lever $l$ which is suitably arranged to oscillate the cam 9 for elevating the auxiliary twister $x$, when the lever $l$ is moved forwardly, and lowered when the lever is moved in the direction indicated in dotted lines in Fig. 1. On this reach C are provided the lugs 16 and 17. When the platform M moves forward its limit it engages the lug 16 on reach C and operates lever $l$ to elevate the auxiliary twister $x$, and when it reaches the other extremity of its movement it contacts with the lug 17 and operates the reach C and lever $l$ to lower the auxiliary twister.

To the reach C is pivotally connected at $16^a$ a lever J' which has its opposite end slidably connected in a slot $17^a$ of the plate 4; and pivotally connected at 18 with the plate 4 is a lever J which is pivotally connected at 19 with lever J', see Fig. 2. When platform M reaches its extreme rearward movement, as explained, it engages with lug 17, on reach C, and operates to move the same. Such movement of the reach C will also move the lever J' and result in the two levers J and J' closing together as seen in dotted lines in Fig. 2 and operate to move the plate 4, which is also seen in dotted lines in Fig. 2. This will move the notches 4', in plate 4, from beneath the path of travel of the lever 3, so that as the platform is returned the lever will slide over the smooth surface of the plate 4. The engagement of the platform with lug 16 on reach C returns the reach, levers J' and J, and plate 4 to their original positions.

With the platform reaching the extremity of its rearward movement, the hub of the gear W contacts with and operates the lever 5, which through the medium of the rod Y connected therewith and with a cam $v$, will elevate the shears $u$ into contact with the wire from the twister $t$ and at the same time closing the shears $u$.

The wheel A does not have its entire periphery formed with teeth, and thus the trains of gearing Q and Y are given an intermittent movement, and caused to move to the same position a given number of times, this number being determined by the number of turns of the picket wire desired.

Projecting through the frames B, B, is a rock shaft $b^2$ see Fig. 3, carrying a dog $m$, arranged to engage the projections $q$ and $q'$, respectively, disposed at the opposite ends of the path of travel of the frames B, B.

Crank arms $b^3$ are spaced apart on this shaft and the same have their outer ends connected to links $b^4$ which are also eccentrically connected to the oscillatory dogs $k$, $k$, and which actuate said dogs either to the positions $k'$, $k'$, or the reverse, this movement depending on the direction in which the dog $m$ is moved. The dogs $k$, $k$, lift and hold the wires $z$, as they are drawn out from the twister.

In operation, the wires $w, w', w'', w''', w''''$, are stretched through and over the machine, by suitable means (not shown) for longitudinal movement. Power is then applied to the shaft S by the chain $n$, meshing with the gear T, which has a ratchet clutch connection with the shaft S (see Figs. 1 and 14), the shaft thus being capable of movement in but one direction, as indicated by the arrow on the gear $c''$ in Fig. 1. The frames being in the position indicated in full lines in Fig. 1, the lever L, is operated whereby the pulley P and clutch 8 interlock so that the gear P' will be rotated and the endless chain $n$ will rotate the gear T carried by the shaft S and also the gear $c''$, as indicated by the arrow. At the same time the lever $l$ is moved to operate the clutch 7, to rotate the gear A, mounted on the shaft common to the twister $x$. The twister $x$ will therefore be revolved with the notch in its top away from the twister $t$.

X indicates a sliding pin mounted in the twister $x$, and being adapted to move outwardly over the wire $z$, after it has dropped into the holders $o$, $o$, and as the twister $x$ revolves, it forces the wire $z$ around and firmly twists the same upon the wire $w''''$, as shown in diagrammatical view, Fig. 13.

The auxiliary twister $x$, twists the wire ends on the wire $w''''$ simultaneously with the securing of the picket wires to the longitudinal wire $w'''$, by the twister $t$ and as soon as the picket wires are thus secured, the clutch 7 is released so as to prevent further rotation of the twister $x$, and the projection $d$ upon the shaft S will then strike the lever 3, throwing it out of the notch 4', and closing the clutch at $b$, to engage the gears W, W', and thus moving the platform or frame M, together with the frames B, B, toward the position B', the yoke N, during its movement passing out of one notch U, into the next succeeding one, thereby lifting the adjacent end of the frame B, carrying twister $t$ from and over wire $w'''$ and falling over next wire indicated at $w''$, in the same position as the twister $t$ is shown upon wire $w'''$, and then the operation of twisting the wire $z$ is repeated by the continual moving of the shaft S, as in the first twisting operation. The notches U corresponding in number to the number of longitudinal wires, the twister $t$ will be brought into engagement with said wires in a successive manner, and as the shaft S, begins to revolve, the wires $z$ will be drawn from the spools 10 and twisted about said longitudinal wires in the manner previously indicated. When the cross-piece or yoke N, leaves the last notch U, in the beam $f'$, it strikes a projection $c^a$, on the cam $c$, and thereby forces said cam to a position indicated at $c'$, and the frame B, now being elevated, the twister $t$, is removed from engagement with the wire $w$ and the wire $z$ drawn, as indicated by the dotted line $z'$, Fig. 1, and the platform M then engages the lever 5, moving it to the position 6, and the rod $y$ to a position $y'$, whereby the cam $v$ is turned and which in moving, elevates the shears $u$ into engagement with the wire $z$, clipping it at $z'$ adjacent the wire $w$, as also shown in Fig. 1. After this operation, the frames B, B, being in the position B', the dog $m$, strikes a projection $q'$, carried by the frame beam $f'$, and is swung to a position $m'$, thereby operating the rock shaft $b'$ and forcing downwardly the links $b^4$ so that the dogs $k, k$, in turn are moved outwardly to the positions $k', k'$, so as to lift the free ends of the wires $z, z$.

The piece C being moved to C', the lever J is moved to J', the plate 4 to 4'', and the rod 1 in its movement to the position 2, rocks the cam 9, which allows the auxiliary twister $x$ to drop to a position below the wire $w''''$. The longitudinal wires are then moved longitudinally so as to permit of the spreading of a new set of pickets, the power at pulleys P, P, being then reversed. The shaft S, remains stationary during this movement, and the lever 3 being prevented from falling into the notches 4', applies the clutch at X', by shifting the cone of part X' into frictional engagement with the cone of part X. The shaft $s$ then turning the gears W, W' and moving the frame M back to its normal position. In this reverse movement, the yoke N travels on the cam $c$, which is elevated, and said yoke is thus prevented from engaging the notches U, but, when the yoke strikes the lug $c^b$, the cam is moved to its normal lowered position and the yoke will be lowered into the first notch U, and the twister placed over the wire $w'''$. When in this position, the dog impinges the stop $q$ so as to turn the same to the position $k$, in Fig. 3, thereby dropping the wires $z$ into the holders $o, o$.

In the auxiliary twister $x$, are the pins X, X, pushed toward the holders $o, o$, by reason of the spring 12. These pins engage the wire $z$ as the twister $x$ revolves, thereby twisting the end firmly about the wire $w''''$, as shown in Fig. 13. The twister $t$ turning about the wire $w'''$, unwinds the wire $z$ from the spool 10, over the rods 11, which give proper tension to the picket wire $z$, out on to the wire $w'''$. Each twister head is arranged symmetrically and twists and draws out simultaneously two pickets. For each twister $t$, there is an auxiliary $x$, twisting the end of each wire $z$, and for each wire $z$, there is a shear $u$ adapted to sever the picket as the frames B reach the limit of their forward travel.

The spools 10 are constructed with an axis 13 formed in two parts, between which is placed a spring. These parts can by this construction be compressed, thus allowing the spools 10 to be removed when empty and replaced when filled with wire.

The number of frames B can be varied and other alterations resorted to, as will be apparent, without departing from the spirit of the invention.

I claim

1. In a machine of the type set forth, a sliding and oscillating frame, a wire twister mounted therein, means for feeding wire to said twister, means for revolving said twister, and means for simultaneously sliding said frame and elevating one end thereof at predetermined intervals.

2. In combination with a frame, a segmental twister head carried thereby, a detachable spool for feeding wire through said head, means for revolving said head at predetermined intervals, means for sliding and oscillating said frame, the movement of said frame being alternate with the revolving of said head, and cutting means, and means for raising said cutting means for severing the wire fed through said head.

3. In a machine of the type set forth, a segmental twister head, a spool arranged in juxtaposition thereto, said twister head having a slot through which wire is passed from said spool, holders carried by said head, and a spring pressed pin projecting without said twister and co-acting with said holders.

4. In a machine of the type set forth, a frame, means for sliding and raising and lowering said frame, a segmented twister head having spools, an auxiliary twister arranged without and being unconnected to said frame, means for revolving said twisters, divided holders secured to said auxiliary twister, and spring pressed pins bearing against the same, substantially as and for the purpose specified.

5. In a machine of the type set forth, a frame, a plurality of fixed holders, twisters carried by said frame, twisters co-acting with said holders and being immovable with said frame, means for imparting to said twisters an intermittent movement, and means for actuating said frame.

6. In a machine of the type set forth, a movable frame, means for operating the same, a twister carried thereby, means for feeding wire through the twister, a vertically movable holder, means for operating the same, a twister acting in conjunction therewith, shears, and means for operating said shears when the frame reaches one limit of its movement.

7. In a machine of the type set forth, a movable frame carrying a wire twister, means for alternately raising and lowering the frame at predetermined points as it moves in one direction in its course, and means whereby as the frame is brought back to its normal position it travels in an approximately straight plane.

8. In a machine of the type set forth, a notched beam, a movable frame having a yoke adapted for successive engagement with the notches of said beam, means for moving the yoke into said notches in one direction of the travel of the frame, means for moving the frame in the reverse direction, and means whereby the yoke of the frame is prevented from entering the notches of said beam during its travel in the reverse direction.

9. In a machine of the type set forth, a notched beam, a movable frame operating longitudinally of said beam, a yoke secured to said frame and engaging the notches thereof, and means for closing the notches against the introduction of the said yoke, and means for raising and lowering the said means.

10. In a machine of the type set forth, a movable frame, means for operating said frame, a twister mounted in the frame, means for feeding wire through the twister, an auxiliary twister, means for raising and lowering the same, and means for cutting the wire fed through the last named twister, said means being alternately raised and lowered.

11. In a machine of the character described, an oscillating frame, a series of spools on the free end of the frame, the said spools having their axes arranged in line and adapted to feed a series of parallel stay wires simultaneously.

12. In a machine of the character described, a reciprocating platform, an oscillating frame supported upon the platform, a pair of spools revolubly supported on the free end of the frame and having their axes in line, and means for feeding a series of stringer wires in a plane corresponding to the longitudinal axis of said spools.

13. In a machine of the character described, a reciprocating platform, a pair of frames supported on the platform, their forward ends adapted to be intermittently raised and lowered, and a pair of spools revolubly supported on the free end of the frames and having their axes arranged in line.

14. In a machine of the character described, the combination of a plurality of oscillating frames, a pair of spools revolubly mounted in each frame, having their axes arranged in line, power devices for reciprocating the frames, and mechanism carried by one of said frames whereby motion is imparted from suitable power devices to the spools of all the frames.

15. In a machine of the character described, an oscillating frame, a twister head revolubly mounted in said frame, and a pair of wire spools which have their axes arranged in line carried by said twister head.

16. In a machine of the character described, an oscillating frame, a twister head revolubly mounted in said frame, and a pair of wire spools having their axes arranged in line eccentrically supported in said twister head.

17. In a machine of the character described, the combination of a plurality of frames mounted to have their forward ends raised and lowered intermittently, a twister head mounted in each of said frames and a pair of wire spools suitably carried in each of said twister heads, the axes of the spools of each of said twister heads being arranged in line.

18. In a machine of the character described, the combination of a plurality of frames mounted to have their forward ends raised and lowered intermittently, a twister head revolubly carried in each of said frames, and a pair of wire spools eccentrically supported in each of said twister heads, the axes of the spools of each and all of the twister heads being arranged in line.

19. In a machine of the character described, a reciprocating platform, a plurality of frames supported on said platform, and adapted to have their forward ends raised and lowered intermittently, connections between the frames to facilitate their being raised and lowered in unison, and a plurality of spools revolubly mounted in said frames and having their axes arranged in line.

20. In a machine of the character described, a reciprocating platform, a plurality of frames supported on said platform and adapted to have their forward ends raised and lowered at pre-determined intervals, connections between the frames to facilitate their being raised and lowered in unison, a twister head revolubly mounted in each frame, and a plurality of spools carried by said twister heads.

21. In a machine of the character described, a reciprocating platform, a plurality of frames supported on said platform and adapted to have their forward ends raised and lowered at pre-determined intervals, connections between the frames to facilitate their being raised and lowered in unison, a twister head revolubly mounted in each of said frames and having their axes in line, and a plurality of spools eccentrically carried in the said twister head which also have their axes in line.

22. In a machine of the character described, the combination of a sliding and oscillating frame, means for intermittently raising and lowering the forward end of the frame when the same is moving in one direction, means for retaining the forward end of the frame elevated when the same is moving in the opposite direction, and a plurality of spools which have their axes in line suitably supported in said frame.

23. In a machine of the character described, the combination of a sliding and oscillating frame, means for intermittently raising and lowering the said frame, when moving in one direction, means for retaining the forward end of the frame elevated when the same is moving in the opposite direction, a twister head revolubly mounted in said frame, and a plurality of spools which have their axes arranged in line eccentrically supported on said twister head.

24. In a machine of the character described, the combination of a plurality of sliding and oscillating frames, a yoke connecting each pair of frames, means engaged by the yoke for intermittently raising and lowering the yoke and the frames connected therewith when the same are moving in one direction, and means for retaining the yoke and said frames in an elevated position when moving in the opposite direction.

25. In a machine of the character described, the combination of a plurality of sliding and oscillating frames, a yoke connecting each pair of frames, means for elevating and lowering the yoke and the frames connected therewith at pre-determined intervals when the frames are moving in one direction, means for retaining the same elevated when they are moving in the opposite direction, and suitable twister heads revolubly mounted in each of said frames.

26. In a machine of the character described, the combination of a sliding and oscillating frame, a notched bar extending longitudinal with the movement of the said frame, a yoke attached to the frame adapted to intermittently and successively engage the notches of the bar aforesaid when the frame is moving in one direction, a supplemental bar coacting with the notched bar adapted to be elevated by the yoke when the frame reaches the limit of its movement in one direction, the said supplemental bar adapted to retain the yoke and frame elevated when the said frame is moving in the opposite direction, the said supplemental bar being lowered through the action of the yoke when the same reaches its forward limit in the movement thereof.

27. In a machine of the character described, the combination of a reciprocating frame, a twister head revolubly supported therein, a plurality of spools having their axes in line supported by said twister head, an auxiliary twister arranged without and being unconnected to said frame, and means operating at pre-determined intervals for actuating the last mentioned twister.

28. In a machine of the character described, the combination of a reciprocating frame, a twister head revolubly supported therein, a plurality of spools having their axes in line supported by said twister head, an auxiliary twister arranged without and being unconnected to said frame, means for operating the twister-head of the frame, means for operating the supplemental twister, and means carried by the frame actuated at pre-determined intervals for placing stay wires in position to be acted upon by said supplemental twister.

29. In a machine of the character described, the combination of a plurality of reciprocating frames, a twister head revolubly mounted in each frame, spools carried by said twister heads, means for actuating the said twister heads, a plurality of auxiliary twisters arranged without and being unconnected to said frames, the said auxiliary twisters having their axes arranged in line, and means for simultaneously actuating the said auxiliary twisters at pre-determined intervals.

30. In a machine of the character described, the combination of a plurality of reciprocating frames, means for moving said frames in unison, a twister head in each frame, the same having their axes arranged in line, a plurality of spools eccentrically supported in each twister head, a plurality of auxiliary twisters arranged without and being unconnected to said frame, and means for actuating said auxiliary twisters in unison and at pre-determined intervals.

31. In a machine of the character described, the combination of a plurality of reciprocating frames, means for moving said frames in unison, a twister head in each frame, the same having their axes arranged in line, a plurality of spools eccentrically supported in each twister head, a plurality of auxiliary twisters arranged without and being unconnected to said frame, the same having their axes arranged in line, and means for actuating said auxiliary twisters in unison and at pre-determined intervals.

32. In a machine of the character described, the combination of a reciprocating platform, a frame supported thereby adapted to have its forward end raised and lowered at pre-determined intervals, a twister head mounted in the frame, one or more spools mounted in said twister head, an auxiliary twister arranged without and being unconnected to said frame, a cutting mechanism, means engaged by said platform for actuating the cutting mechanism, means for intermittently actuating the twister head of the frame, and mechanism adapted to be set into motion by the said platform for operating the auxiliary twister at pre-determined intervals.

33. In a machine of the character described, the combination with means for feeding a series of stringer wires, one or more twisters having their axes arranged in line through which one of the outside stringer wires is fed, a reciprocating frame, a twister head carried thereby, the same adapted to successively engage all the stringer wires with the exception of the outside wire first mentioned, one or more spools carried by said twister head, means for reciprocating said frame, mechanism for operating the twister thereof, and means for operating the twister or twisters of the outside stringer wire at pre-determined intervals.

34. In a machine of the class described, a frame, twisters, spools revolubly mounted in the frame, the twisters being in alinement with respect to each other and eccentric to the alinement of the spools, and a row of twisters in advance of the aforesaid twisters.

35. In a machine of the class described, an oscillating frame, twisters, spools revolubly mounted in the frame, the twisters being in alinement with respect to each other and eccentric to the alinement of the spools, and a row of twisters in advance of the aforesaid twisters.

In testimony whereof I have signed my name to this specification in the presence of two subscribing witnesses.

HENRY R. OBERHOLTZER.

Witnesses:
    HENRY PETERSON,
    C. C. CLIFTON.